United States Patent
Yoshida et al.

(10) Patent No.: US 9,759,086 B2
(45) Date of Patent: Sep. 12, 2017

(54) VARIABLE NOZZLE UNIT, VARIABLE GEOMETRY SYSTEM TURBOCHARGER, AND POWER TRANSMISSION MEMBER MANUFACTURING METHOD

(71) Applicant: IHI Corporation, Koto-ku (JP)

(72) Inventors: Satoshi Yoshida, Tokyo (JP); Katsunori Nakagawa, Nagano (JP); Yasutaka Sakai, Tokyo (JP)

(73) Assignee: IHI Corporation, Koto-ku (JP)

( * ) Notice: Subject to any disclaimer, the term of this patent is extended or adjusted under 35 U.S.C. 154(b) by 387 days.

(21) Appl. No.: 14/659,171

(22) Filed: Mar. 16, 2015

(65) Prior Publication Data
US 2015/0184534 A1 Jul. 2, 2015

Related U.S. Application Data

(63) Continuation of application No. PCT/JP2013/074301, filed on Sep. 10, 2013.

(30) Foreign Application Priority Data

Sep. 28, 2012 (JP) .................. 2012-216854

(51) Int. Cl.
*F01D 17/16* (2006.01)
*B22F 3/22* (2006.01)
(Continued)

(52) U.S. Cl.
CPC .............. *F01D 17/16* (2013.01); *B22F 3/004* (2013.01); *B22F 3/1021* (2013.01); *B22F 3/12* (2013.01);
(Continued)

(58) Field of Classification Search
CPC ........ F01D 17/16; F01D 17/165; B23F 3/004; B23F 3/1021; B23F 3/12; B23F 3/225;
(Continued)

(56) References Cited

U.S. PATENT DOCUMENTS 6,488,887 B1 * 12/2002 Arai .................... B22F 3/22
419/5
2005/0112016 A1 5/2005 Tanaka
2007/0068155 A1 3/2007 Hayashi et al.

FOREIGN PATENT DOCUMENTS

CN 2419375 Y 2/2001
CN 1662330 A 8/2005
(Continued)

OTHER PUBLICATIONS

Combined Chinese Office Action and Search Report issued Sep. 2, 2016 in Patent Application No. 201380049675.9 (with English translation of categories of cited documents).
(Continued)

*Primary Examiner* — Richard Edgar
(74) *Attorney, Agent, or Firm* — Oblon, McClelland, Maier & Neustadt, L.L.P.

(57) ABSTRACT

Power transmission members, such as synchronous joint members, are each formed by sintering a compact which is molded from a mixture containing metal powder and a binder, as an injection material, by metal powder injection molding. Flow promotion recesses configured to facilitate a flow of the mixture to areas corresponding to power transmission surfaces or the like when the compact is molded are formed in each of two side surfaces of each power transmission member.

10 Claims, 12 Drawing Sheets

(51) Int. Cl.
*B22F 5/10* (2006.01)
*F02C 6/12* (2006.01)
*B22F 3/00* (2006.01)
*B22F 3/12* (2006.01)
*B22F 5/00* (2006.01)
*F02B 37/22* (2006.01)
*F02B 37/24* (2006.01)
*B22F 3/10* (2006.01)

(52) U.S. Cl.
CPC ............... *B22F 3/225* (2013.01); *B22F 5/00* (2013.01); *B22F 5/009* (2013.01); *B22F 5/10* (2013.01); *F01D 17/165* (2013.01); *F02B 37/22* (2013.01); *F02B 37/24* (2013.01); *F02C 6/12* (2013.01); *F05D 2220/40* (2013.01); *F05D 2230/21* (2013.01); *F05D 2260/50* (2013.01); *Y02T 10/144* (2013.01)

(58) Field of Classification Search
CPC .... B23F 5/00; B23F 5/009; B23F 5/10; F02B 37/22; F02B 37/24; F02C 6/12; F05D 2220/40; F05D 2230/21; F05D 2260/50; Y02T 10/144
See application file for complete search history.

(56) References Cited

FOREIGN PATENT DOCUMENTS

| | | |
|---|---|---|
| CN | 1920262 A | 2/2007 |
| JP | 2001-140001 A | 5/2001 |
| JP | 2003-254075 A | 9/2003 |
| JP | 2004-307961 A | 11/2004 |
| JP | 2008-088849 A | 4/2008 |
| JP | 2009-293418 A | 12/2009 |
| JP | 2010-065540 A | 3/2010 |
| JP | 2010-065591 A | 3/2010 |
| JP | 2010-071138 A | 4/2010 |
| JP | 2010-071142 A | 4/2010 |
| JP | 2010-275878 A | 12/2010 |
| JP | 2011-157816 A | 8/2011 |
| JP | 2012-052520 A | 3/2012 |

OTHER PUBLICATIONS

International Search Report mailed Nov. 5, 2013 for PCT/JP/2013/074301 filed Sep. 10, 2013 with English Translation.
International Written Opinion mailed Nov. 5, 2013 for PCT/JP/2013/074301 filed Sep. 10, 2013.

* cited by examiner

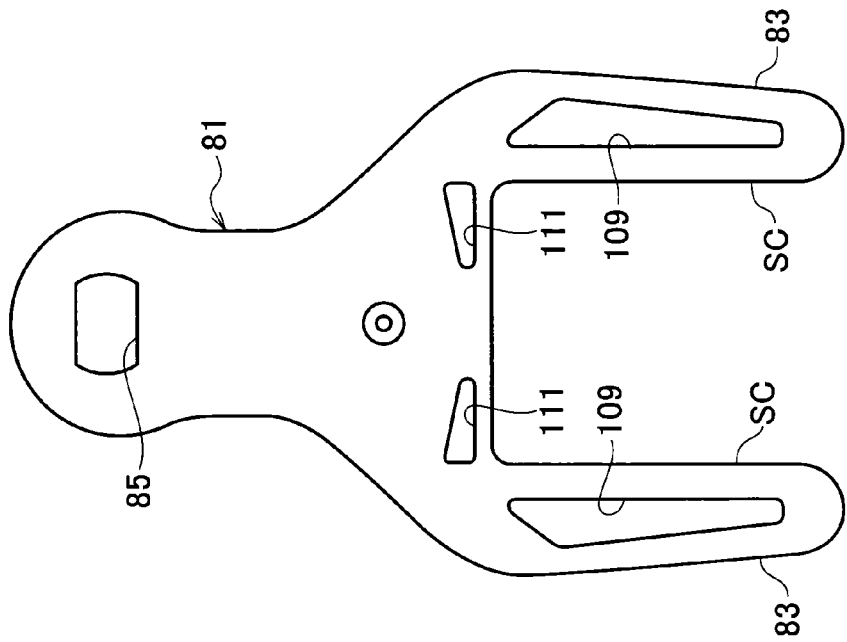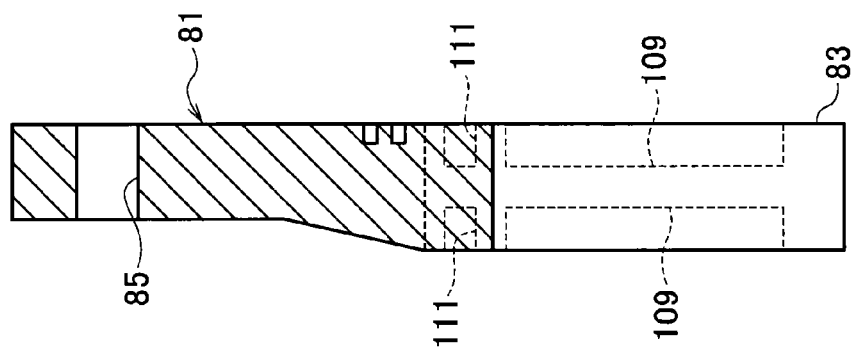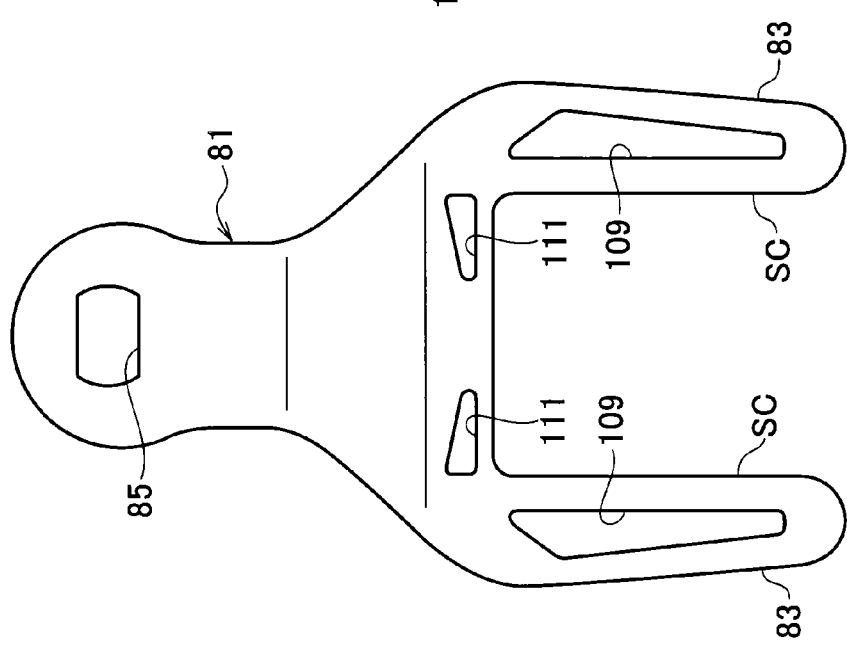

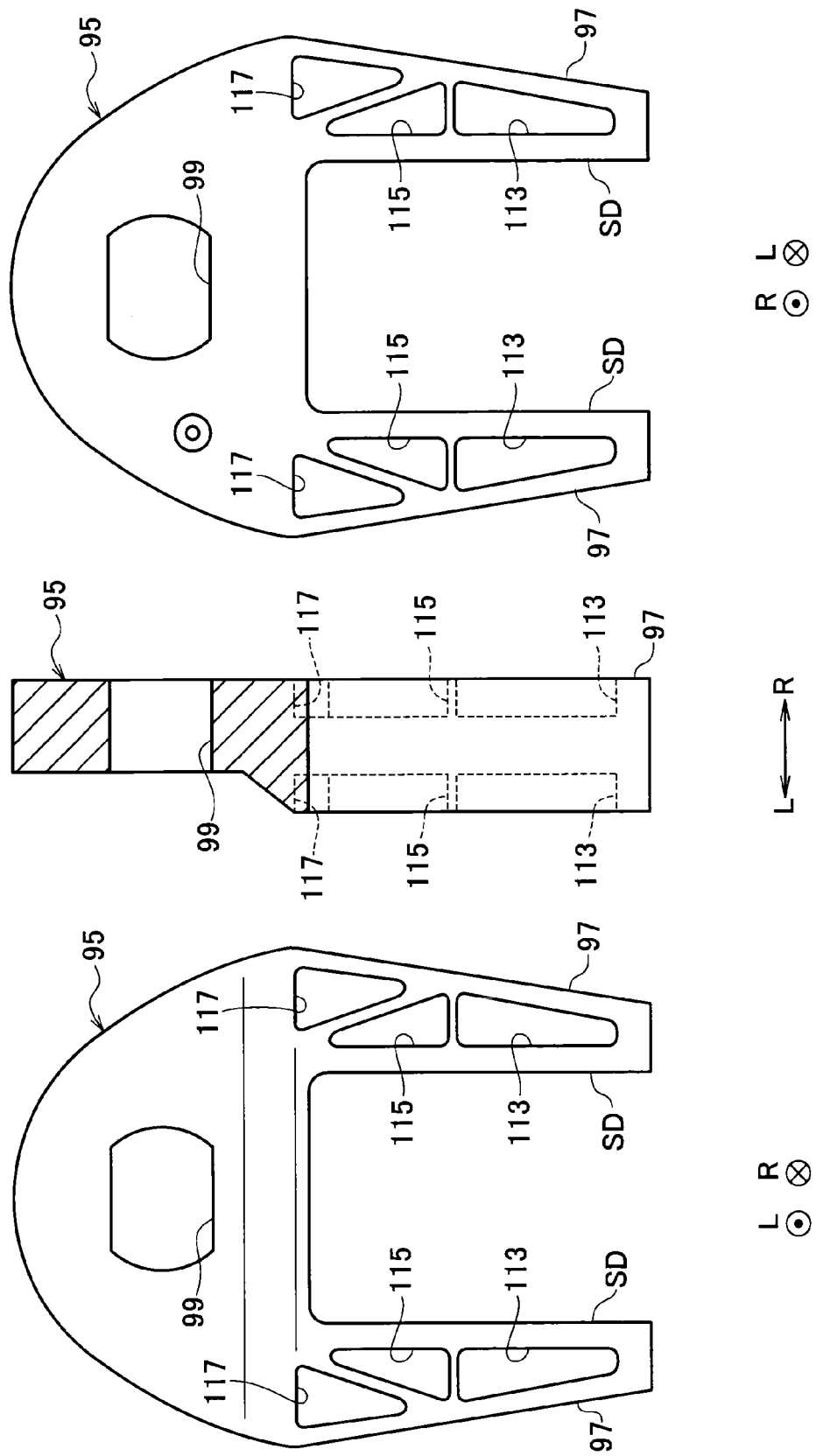

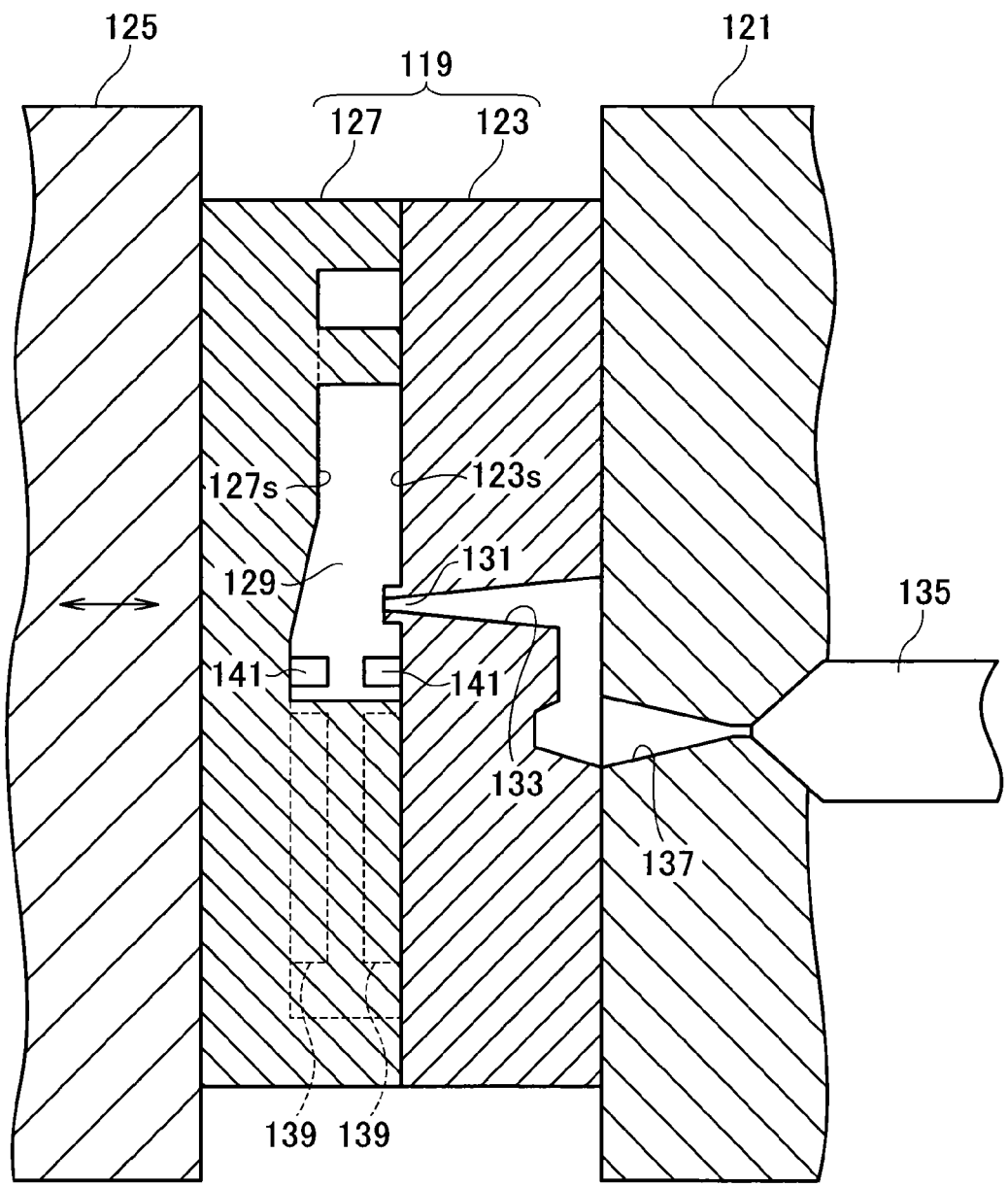

VARIABLE NOZZLE UNIT, VARIABLE GEOMETRY SYSTEM TURBOCHARGER, AND POWER TRANSMISSION MEMBER MANUFACTURING METHOD

CROSS REFERENCE TO RELATED APPLICATIONS

This application is a continuation application of International Application No. PCT/JP2013/074301, filed on Sep. 10, 2013, which claims priority to Japanese Patent Application No. 2012-216854, filed on Sep. 28, 2012, the entire contents of which are incorporated by references herein.

BACKGROUND

1. Technical Field

The present invention relates to a variable nozzle unit capable of varying a passage area for (a flow rate of) an exhaust gas supplied to a turbine impeller side of a variable geometry system turbocharger, and the like.

2. Description of the Related Art

Various developments have been made for variable nozzle units to be installed in variable geometry system turbochargers in recent years.

A concrete configuration of a variable nozzle unit according to a conventional technology is as follows. Inside a turbine housing of a variable geometry system turbocharger, a base ring is disposed concentrically with a turbine impeller. Multiple supporting holes are formed to penetrate the base ring at equal intervals in the circumferential direction of the base ring. Furthermore, multiple variable nozzles are disposed on the base ring at equal intervals in the circumferential direction in such a way as to surround the turbine impeller. The variable nozzles are rotatable about their respective axes which are parallel to the axis of the turbine impeller. Moreover, a nozzle shaft is integrally formed on a side surface of each variable nozzle on one side in the axial direction of the turbine impeller. Each nozzle shaft penetrates and is rotatably supported by its corresponding supporting hole in the base ring.

A link mechanism for synchronously rotating the multiple variable nozzles is disposed on one side of the base ring in the axial direction.

A concrete configuration of the link mechanism is as follows. On the one side of the base ring in the axial direction, a driving ring is provided rotatably and concentrically with the base ring. In addition, as many synchronous joint members as the variable nozzles are disposed on the driving ring at equal intervals in the circumferential direction. Each synchronous joint member has power transmission surfaces on two sides in the circumferential direction (on two sides in a direction orthogonal to the radial direction). Furthermore, a driving joint member is provided to the driving ring. The driving joint member has power transmission surfaces on two sides in the circumferential direction.

A base end portion of a nozzle link member is integrally connected to the nozzle shaft of each variable nozzle. A tip end side of each nozzle link member is engaged with its corresponding synchronous joint member in such a way as to sandwich the synchronous joint member from the two sides. In addition, each nozzle link member has a pair of power transmission surfaces on its tip end side, which can be brought into sliding contact with the power transmission surfaces of the corresponding synchronous joint member.

A driving shaft is provided in a bearing housing as a fixed section of the variable geometry system turbocharger in such a way as to be rotatable about its axis parallel to the axis of the turbine impeller. The driving shaft is rotated by the drive of a rotary actuator. A base end portion of a driving link member is integrally connected to an end portion of the driving shaft on an opposite side in the axial direction. A tip end side of the driving link member is engaged with the driving joint member in such a way to sandwich the driving joint member. Moreover, the driving link member has a pair of power transmission surfaces on its tip end side, which can be brought into sliding contact with the power transmission surfaces of the driving joint member.

Accordingly, if the engine speed is in a high speed range while the variable geometry system turbocharger is in operation, the drive of the rotary actuator rotates the driving shaft in one direction, thus swinging the driving link member in the one direction, and rotating the driving ring in a forward direction. This swings the multiple nozzle link members in the forward direction, and concurrently rotates the multiple variable nozzles synchronously in the forward direction (opening direction). Thus, it is possible to increase the passage area for (the flow rate of) the exhaust gas to be supplied to the turbine impeller side.

On the other hand, if the engine speed is in a low speed range, the drive of the rotary actuator rotates the driving shaft in the other direction, thus swinging the driving link member in the other direction, and rotating the driving ring in a reverse direction. This swings the multiple nozzle link members in the reverse direction, and concurrently rotates the multiple variable nozzles synchronously in the reverse direction (closing direction). Accordingly, it is possible to decrease the passage area for the exhaust gas to be supplied to the turbine impeller side.

SUMMARY OF THE INVENTION

Meanwhile, metal powder injection molding (MIM) enabling high-strength compacts to be manufactured with high dimensional precision has drawn attention in recent years as a fifth-generation precision machining technology which follows machining, die casting, powder metallurgy and precision casting. In response, attempts to apply the metal powder injection molding to production of the synchronous joint members, the driving joint member and the nozzle link members are being made.

When, however, the power transmission members (compacts for the power transmission members) are actually manufactured by the metal powder injection molding using a mixture of metal powder and a binder as an injection material, sink marks are likely to occur in the power transmission surfaces of the members. In this case, it is difficult to sufficiently secure the precision in the dimension and shape of the power transmission surfaces of the power transmission members.

With this taken into consideration, the present invention aims to provide a variable nozzle unit, a variable geometry system turbocharger and a power transmission member manufacturing method each with a novel configuration, which are capable of sufficiently securing the precision in the dimension and shape of the power transmission surfaces of the power transmission members even when the metal powder injection molding is applied to the production of the power transmission members.

A first aspect of the present invention provides a variable nozzle unit which is capable of varying a passage area for (a flow rate of) an exhaust gas to be supplied to a turbine impeller in a variable geometry system turbocharger. The variable nozzle unit includes: a base ring disposed concentrically with the turbine impeller inside a turbine housing in the variable geometry system turbocharger, and including multiple supporting holes formed to penetrate the base ring and arranged in a circumferential direction of the base ring; multiple variable nozzles disposed on the base ring in a circumferential direction of the base ring in such a way as to surround the turbine impeller, each variable nozzle being rotatable about its axis parallel to an axis of the turbine impeller, and including a nozzle shaft being integrally formed on a side surface of the variable nozzle on one side in an axial direction of the turbine impeller, and penetrating and being rotatably supported by the corresponding supporting hole in the base ring; and a link mechanism disposed on one side of the base ring in the axial direction, and configured to synchronously rotate the multiple variable nozzles. The link mechanism includes: a driving ring provided on the one side of the base ring in the axial direction, rotatably and concentrically with the base ring; as many synchronous joint members as the variable nozzles, the synchronous joint members disposed on the driving ring at equal intervals in the circumferential direction of the driving ring, and each synchronous joint member having first power transmission surfaces on two sides in the circumferential direction (two sides in a direction orthogonal to a radial direction) of the driving ring; a driving joint member provided to the driving ring, and having second power transmission surfaces on two sides in the circumferential direction of the driving ring; nozzle link members whose base end portions are integrally connected respectively to the nozzle shafts of the variable nozzles, and whose tip end side is engaged with its corresponding synchronous joint member in such a way as to sandwich the synchronous joint member and includes third power transmission surfaces capable of being brought into sliding contact with the first power transmission surfaces of the corresponding synchronous joint member; a driving shaft provided in a fixed section of the variable geometry system turbocharger in such a way as to be rotatable about its axis parallel to the axis of the turbine impeller, and configured to rotate in response to drive of a rotary actuator; and a driving link member whose base end portion is integrally connected to an opposite side of the driving shaft in the axial direction, and whose tip end side is engaged with the driving joint member in such a way as to sandwich the driving joint member and includes fourth power transmission surfaces capable of being brought into sliding contact with the second power transmission surfaces of the driving joint member. Moreover, at least one power transmission member among the synchronous joint members, the driving joint member, the nozzle link members and the driving link member is formed by sintering a compact which is molded from a mixture containing metal powder and a binder, as an injection material, by metal powder injection molding, and flow promotion recesses are formed in two side surfaces of the one power transmission member in the axial direction, the flow promotion recesses configured to promote the mixture to flow to areas corresponding to the power transmission surfaces while the compact is being molded.

In the specification and scope of claims in the application concerned, it should be noted that: the meaning of "disposed" includes being directly disposed and being indirectly disposed with the assistance of another member; and the meaning of "provided" includes being directly provided and being indirectly provided with the assistance of another member. Furthermore, "disposed between the base rings at equal intervals in the circumferential direction in such a way as to surround the turbine impeller" means being disposed between the pair of base rings, which are away from and opposed to each other in the axial direction, at equal intervals in the circumferential direction in such a way as to surround the turbine impeller. Further, the meaning of "the fixed section of the variable geometry system turbocharger" includes part of the bearing housing or the turbine housing in the variable geometry system turbocharger.

A second aspect of the present invention provides a variable geometry system turbocharger configured to supercharge air to be supplied toward an engine by using pressure energy of an exhaust gas from the engine, which includes the variable nozzle unit of the first aspect.

A third aspect of the present invention provides a power transmission member manufacturing method of manufacturing any one power transmission member among the synchronous joint member, the driving joint member, the nozzle link member and the driving link member which are to be used in the variable nozzle unit of the first aspect. The method includes: an injection step of, by use of an injection molding die having molding surfaces whose shapes are similar to shapes obtained by inverting a final shape of the one power transmission member, injecting a mixture containing metal powder and a binder into a cavity defined by the molding surfaces of the injection molding die in a state where recess forming parts having external surfaces whose shapes are similar to shapes obtained by inverting final shapes of the flow promotion recesses are provided in the molding surfaces of the injection molding die, and thereby molding the green compact whose shape is similar to the final shape of the one power transmission member; a degreasing step of removing the binder included in the compact after completion of the injection step; and a firing step of firing and sintering the compact, and thereby thermally contracting the compact to the final shape.

In the specification and scope of claims in the application concerned, it should be noted that the meaning of a "state where recess forming parts are provided" includes: a state where portions of the injection molding die are provided as the recess forming parts; and a state where inserts separate from the injection molding die are set as the recess forming parts.

The present invention can provide a variable nozzle unit, a variable geometry system turbocharger and a power transmission member manufacturing method, which are capable of sufficiently securing the precision in the dimension and shape of the power transmission surfaces of the power transmission members even when the metal powder injection molding is applied to the production of the power transmission members.

BRIEF DESCRIPTION OF THE DRAWINGS

FIG. 1A is a left side view of a nozzle link member of a first embodiment of the present invention, FIG. 1B is a front cross-sectional view of the nozzle link member, and FIG. 1C is a right side view of the nozzle link member.

FIG. 2A is a left side view of a driving link member of the first embodiment of the present invention, FIG. 2B is a front cross-sectional view of the driving link member, and FIG. 2C is a right side view of the driving link member.

FIG. 11 is a diagram for explaining: an injection molding die of a second embodiment of the present invention; and an injection step included in a power transmission member manufacturing method of the second embodiment of the present invention.

DESCRIPTION OF THE PREFERRED EMBODIMENTS

First Embodiment

Figure 3A:
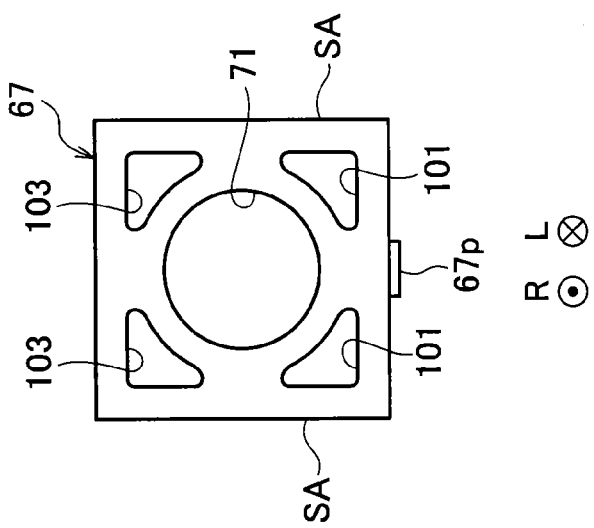
FIG. 3A is a left side view of a synchronous joint member of the first embodiment of the present invention.

Referring to FIGS. 1 to 10, descriptions will be provided for a first embodiment of the present invention. It should be noted that as shown in the drawings, reference sign "R" denotes a direction to the right, and reference sign "L" denotes a direction to the left.

Figure 7:
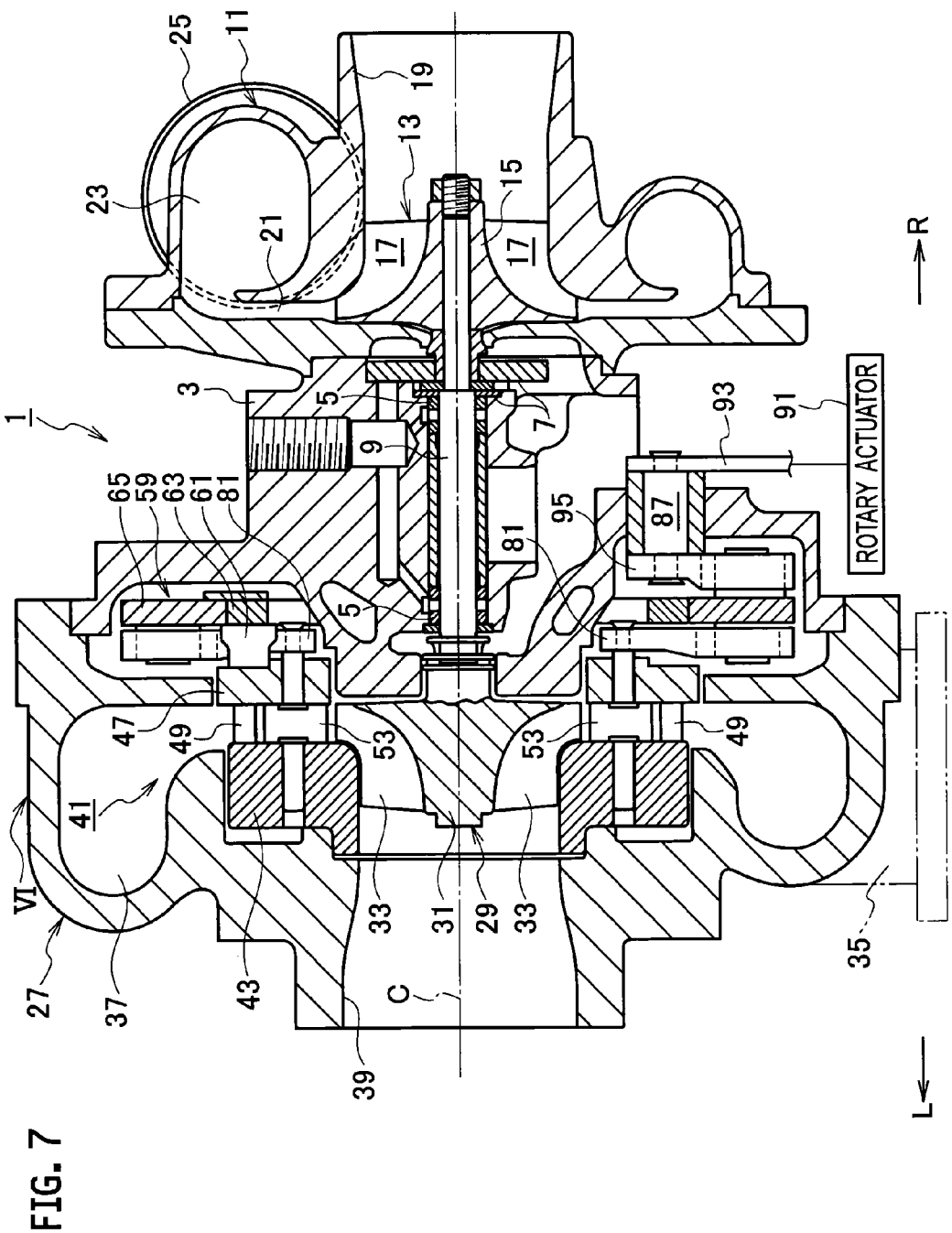
FIG. 7 is a front cross-sectional view of a variable geometry system turbocharger of the first embodiment of the present invention.

As shown in FIG. 7, a variable geometry system turbocharger 1 of the first embodiment of the present invention supercharges (compresses) air to be supplied to an engine (whose illustration is omitted) by use of energy of an exhaust gas from the engine.

A concrete configuration of the variable geometry system turbocharger 1 is as follows. The variable geometry system turbocharger 1 includes a bearing housing 3. A radial bearing 5 and a pair of thrust bearings 7 are provided in the bearing housing 3. Furthermore, a rotor shaft (turbine shaft) 9 extending in the left-right direction is rotatably provided to the multiple bearings 5, 7. In other words, the rotor shaft 9 is rotatably provided to the bearing housing 3 by means of the multiple bearings 5, 7.

A compressor housing 11 is provided on the right side of the bearing housing 3. A compressor impeller 13 configured to compress air using centrifugal force is provided in the compressor housing 11 in such a way as to be rotatable about its axis C (i.e., the axis of the rotor shaft 9). Moreover, the compressor impeller 13 includes: a compressor disk (compressor wheel) 15 integrally connected to the right end portion of the rotor shaft 9; and multiple compressor blades 17 provided on the outer peripheral surface of the compressor disk 15 at equal intervals in the circumferential direction of the compressor disk 15.

An air introduction port 19 configured to introduce the air is formed on an inlet side of the compressor impeller 13 (at a right side portion of the compressor housing 11) in the compressor housing 11. The air introduction port 19 can be connected to an air cleaner (whose illustration is omitted) configured to clean the air. In addition, an annular diffuser passage 21 configured to boost the pressure of the compressed air is formed on an outlet side of the compressor impeller 13 between the bearing housing 3 and the compressor housing 11. Furthermore, a scroll-shaped compressor scroll passage 23 is formed in the compressor housing 11. The compressor scroll passage 23 communicates with the diffuser passage 21. In addition, an air discharge port 25 configured to discharge the compressed air is formed at an appropriate position in the compressor housing 11. The air discharge port 25 communicates with the compressor scroll passage 23, and can be connected to an intake manifold (whose illustration is omitted) of the engine.

Figure 6:
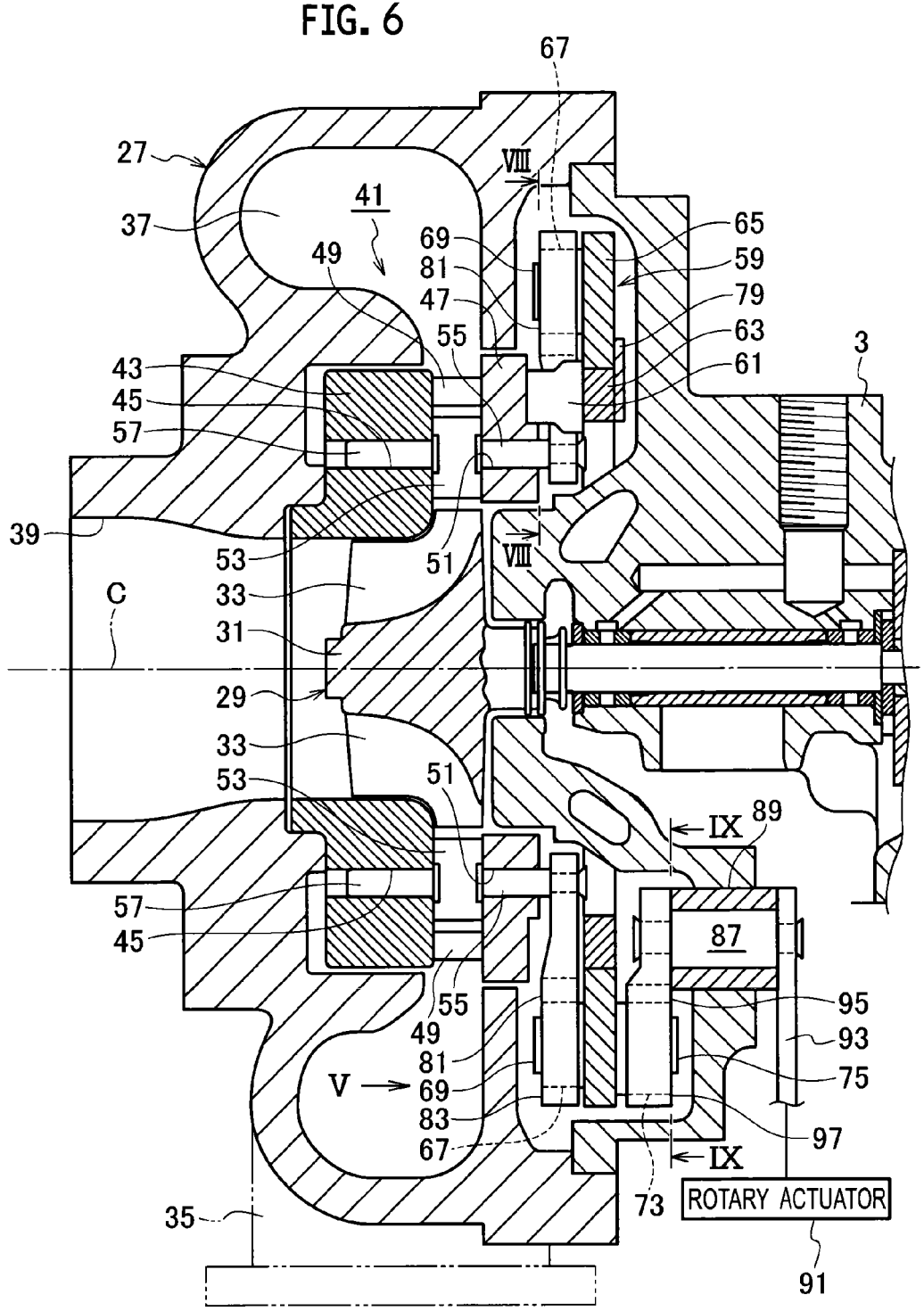
FIG. 6 is a magnified view of an arrow-indicated part VI of FIG. 7.

As shown in FIGS. 6, 7, a turbine housing 27 is provided on the left side of the bearing housing 3. A turbine impeller 29 configured to generate rotational force (rotational torque) by use of pressure energy of the exhaust gas is provided in the turbine housing 27 in such a way as to be rotatable about its axis C (the axis of the turbine impeller 29, i.e., the axis of the rotor shaft 9). Furthermore, the turbine impeller 29 includes: a turbine disk (turbine wheel) 31 integrally provided to the left end portion of the rotor shaft 9; and multiple turbine blades 33 provided on the outer peripheral surface of the turbine disk 31 at equal intervals in the circumferential direction of the turbine disk 31.

A gas introduction port 35 configured to introduce the exhaust gas is formed at an appropriate position in the turbine housing 27. The gas introduction port 35 can be connected to an exhaust manifold (whose illustration is omitted) of the engine.

Furthermore, a scroll-shaped turbine scroll passage 37 is formed in the turbine housing 27. The turbine scroll passage 37 communicates with the gas introduction port 35. In addition, a gas discharge port 39 configured to discharge the exhaust gas is formed on an outlet side of the turbine impeller 29 in the turbine housing 27 (at a left side portion of the turbine housing 27). The gas discharge port 39 can be connected to an exhaust emission control system (whose illustration is omitted) configured to clean the exhaust gas.

The variable geometry system turbocharger 1 is equipped with a variable nozzle unit 41 capable of varying a passage area for (a flow rate of) the exhaust gas to be supplied to the turbine impeller 29 side. A configuration of the variable nozzle unit 41 is as follows.

As shown in FIG. 6, a shroud ring 43 as a first base ring is disposed concentrically with the turbine impeller 29 in the turbine housing 27. The shroud ring 43 covers outer edges (tip edges) of the multiple turbine blades 33. Moreover, multiple supporting holes 45 are formed to penetrate (formed in) the shroud ring 43 at equal intervals in the circumferential direction of the shroud ring 43.

A nozzle ring 47 as a second base ring is provided at a position away from and opposed to the shroud ring 43 in the left-right direction (in the axial direction of the turbine impeller 29) with multiple connecting pins 49, and in a way that the nozzle ring 47 is integral and concentric with the shroud ring 43. Furthermore, multiple supporting holes 51 are formed to penetrate (formed in) the nozzle ring 47 at equal intervals in the circumferential direction of the nozzle ring 47 in such a way as to match the multiple supporting holes 45 in the shroud ring 43. Incidentally, the multiple connecting pins 49 have a function to set a clearance between a facing surface of the shroud ring 43 and a facing surface of the nozzle ring 47.

Between the facing surface of the shroud ring 43 and the facing surface of the nozzle ring 47 (on the facing surface side of the shroud ring 43), multiple variable nozzles 53 are disposed at equal intervals in the circumferential direction of the turbine impeller 29 in such a way as to surround the turbine impeller 29. Each variable nozzle 53 is rotatable in the forward and reverse directions (opening and closing directions) about its axis which is parallel to the axis C of the turbine impeller 29. In addition, a nozzle shaft 55 is integrally formed on the right side surface of each variable nozzle 53 (on the side surface on one side in the axial direction). Each nozzle shaft 55 penetrates and is rotatably supported by (is supported by) its corresponding supporting hole 51 in the nozzle ring 47. In addition, a different nozzle shaft 57 is formed integrally and concentrically with the nozzle shaft 55 on the left side surface of each variable nozzle 53 (on the side surface on an opposite side in the axial direction). Each different nozzle shaft 57 is rotatably supported by its corresponding supporting hole 45 in the shroud ring 43. Incidentally, although each variable nozzle 53 is of a two-end supported type including the nozzle shaft 55 and the different nozzle shaft 57, each variable nozzle 53 may be of a cantilever type not including the different nozzle shaft 57. Furthermore, given the shape of each variable nozzle and its aerodynamic influence, the interval between each two neighboring variable nozzles 53 does not have to be constant. In this case, the intervals between the supporting holes 45 in the shroud ring 43 and the intervals between the supporting holes 51 in the nozzle ring 47 are set aligned with the intervals between the variable nozzles 53. This is the case with the intervals between synchronous joint members 67, too, which will be described later.

A link mechanism (rotation mechanism) 59 configured to rotate the multiple variable nozzles 53 synchronously in the forward and reverse directions is disposed on the right side of the nozzle ring 47 (on the one side in the axial direction). The link mechanism 59 is connected to and interlocks with the nozzle shafts 55 of the multiple variable nozzles 53. A concrete configuration of the link mechanism 59 is as follows.

Figure 10:
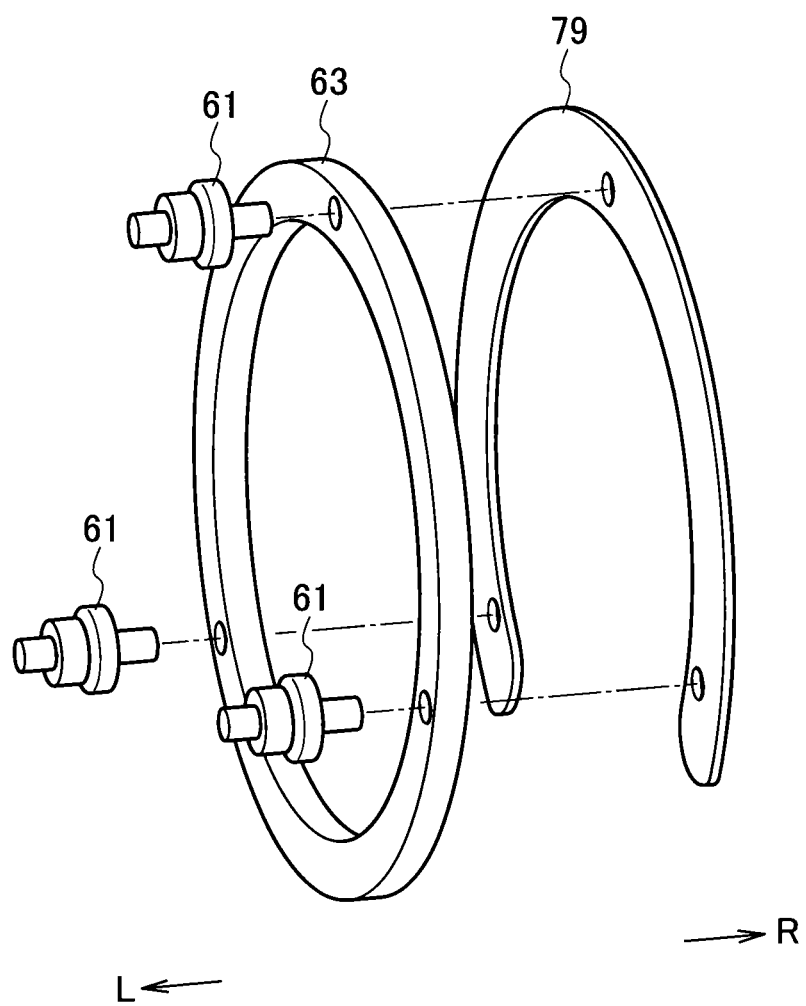
FIG. 10 is a perspective view showing a relationship among multiple attachment pins, a guide ring and a stopper.

As shown in FIGS. 6 and 10, three or more attachment pins 61 are disposed on the right side surface of the nozzle ring 47 (on the side surface on the one side in the axial direction) at intervals in the circumferential direction of the nozzle ring 47. The attachment pins 61 are located outside the supporting holes 51 in the nozzle ring 47 in the radial directions of the nozzle ring 47. In addition, a guide ring 63 is provided over the right end surfaces of the multiple attachment pins 61 (over the end surfaces on the one side in the axial direction). The guide ring 63 is located concentrically with the nozzle ring 47.

A driving ring 65 is rotatably provided on the outer peripheral surface of the guide ring 63. The driving ring 65 is located concentrically with the nozzle ring 47. In other words, on the right of the nozzle ring 47 (on the one side in the axial direction), the driving ring 65 is rotatably provided to the nozzle ring 47 rotatably and concentrically with the nozzle ring 47 by means of the guide ring 63 and the multiple attachment pins 61.

Figure 5:
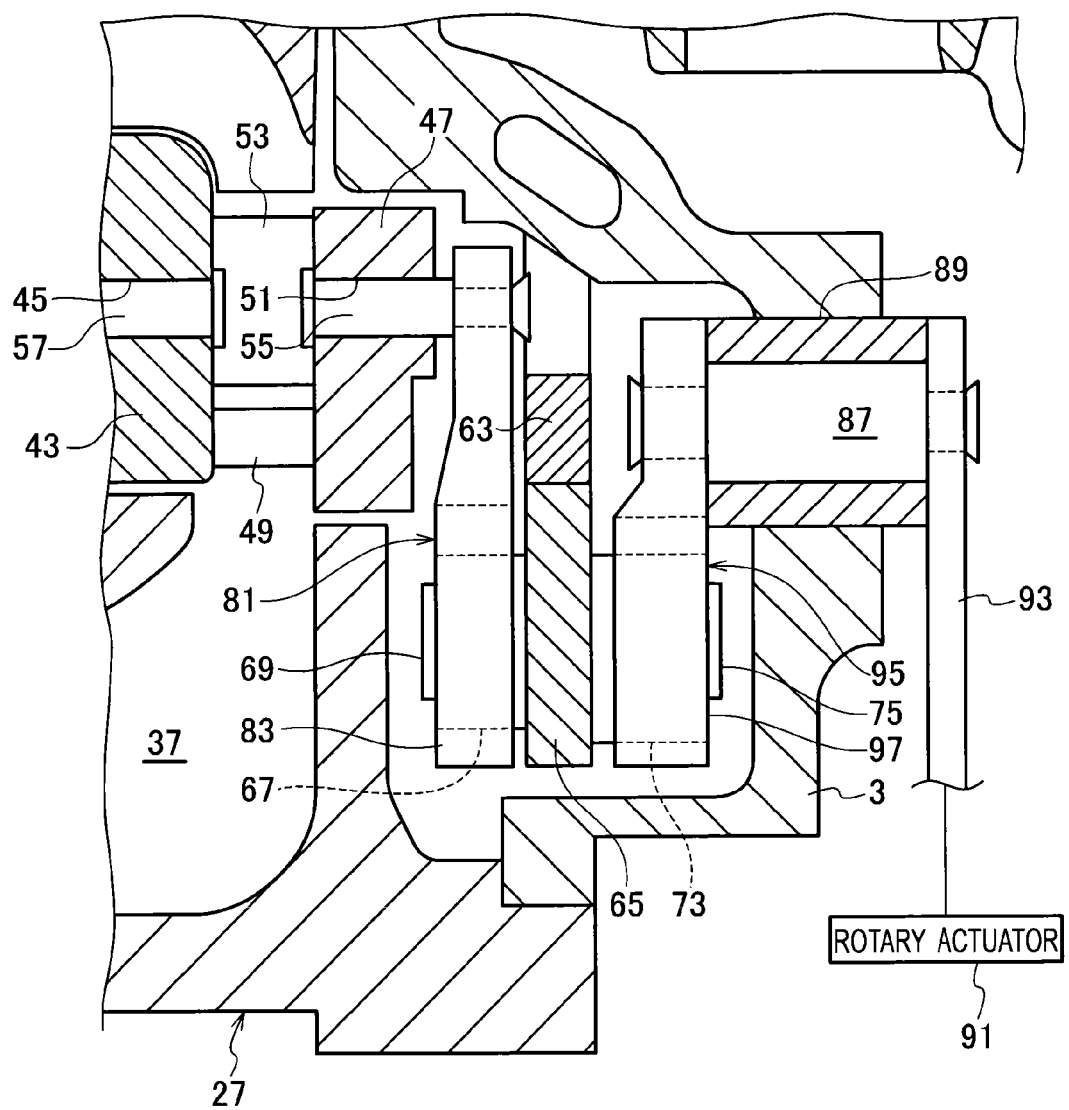
FIG. 5 is a magnified view of an arrow-indicated part V of FIG. 6.
Figure 8:
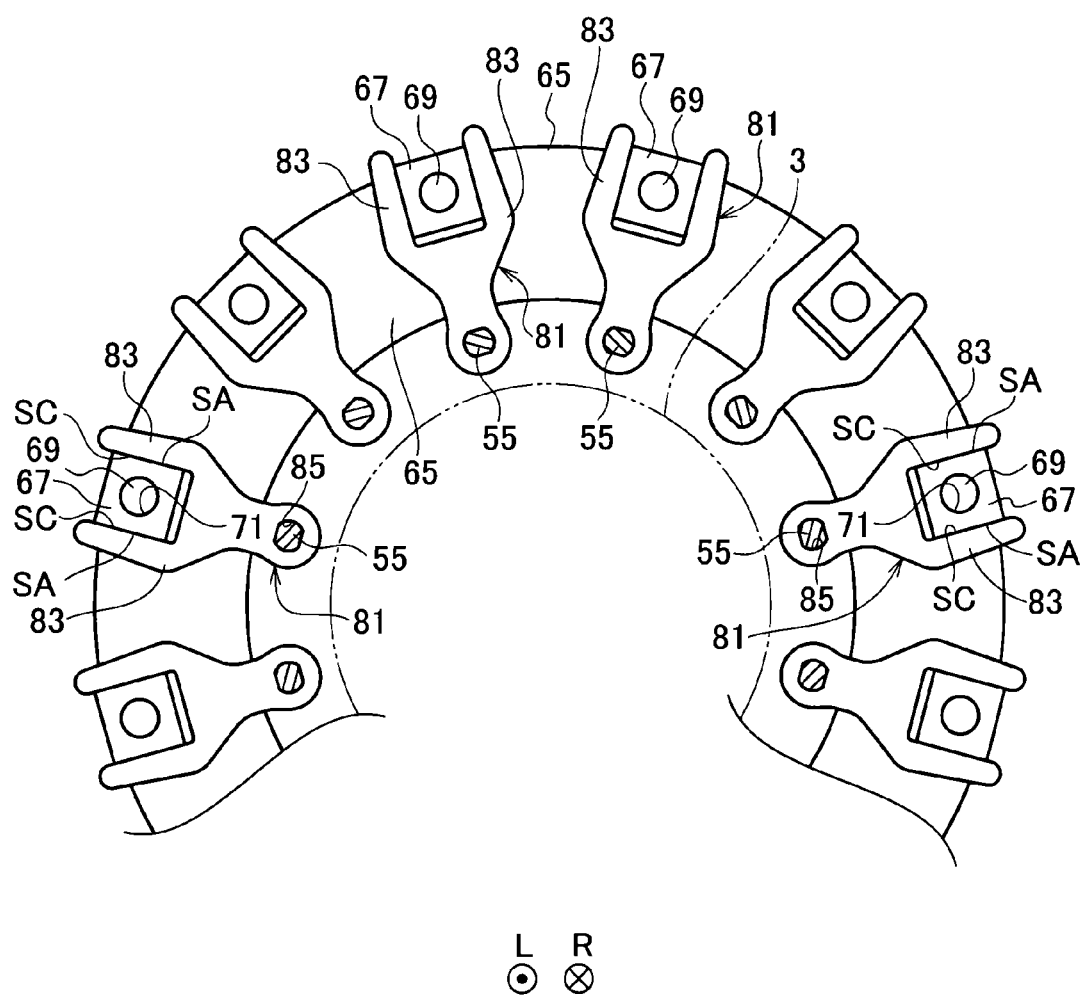
FIG. 8 is a view of a part taken along the VIII-VIII line of FIG. 6.

As shown in FIGS. 5, 6 and 8, multiple rectangular synchronous joint members 67 (as many as the variable nozzles 53) are disposed on the left side surface of the driving ring 65 (on the side surface on the opposite side in the axial direction) at equal intervals in the circumferential direction of the driving ring 65 by means of connecting pins 69. Each synchronous joint member 67 has power transmission surfaces (synchronous joint power transmission surfaces, first power transmission surfaces) SA, respectively, on its two sides in the circumferential direction of the driving ring 65 (on two sides in a direction orthogonal to the radial direction). Furthermore, insertion holes 71 in which to insert the connecting pins 69 are formed to penetrate the synchronous joint members 67.

Figure 9:
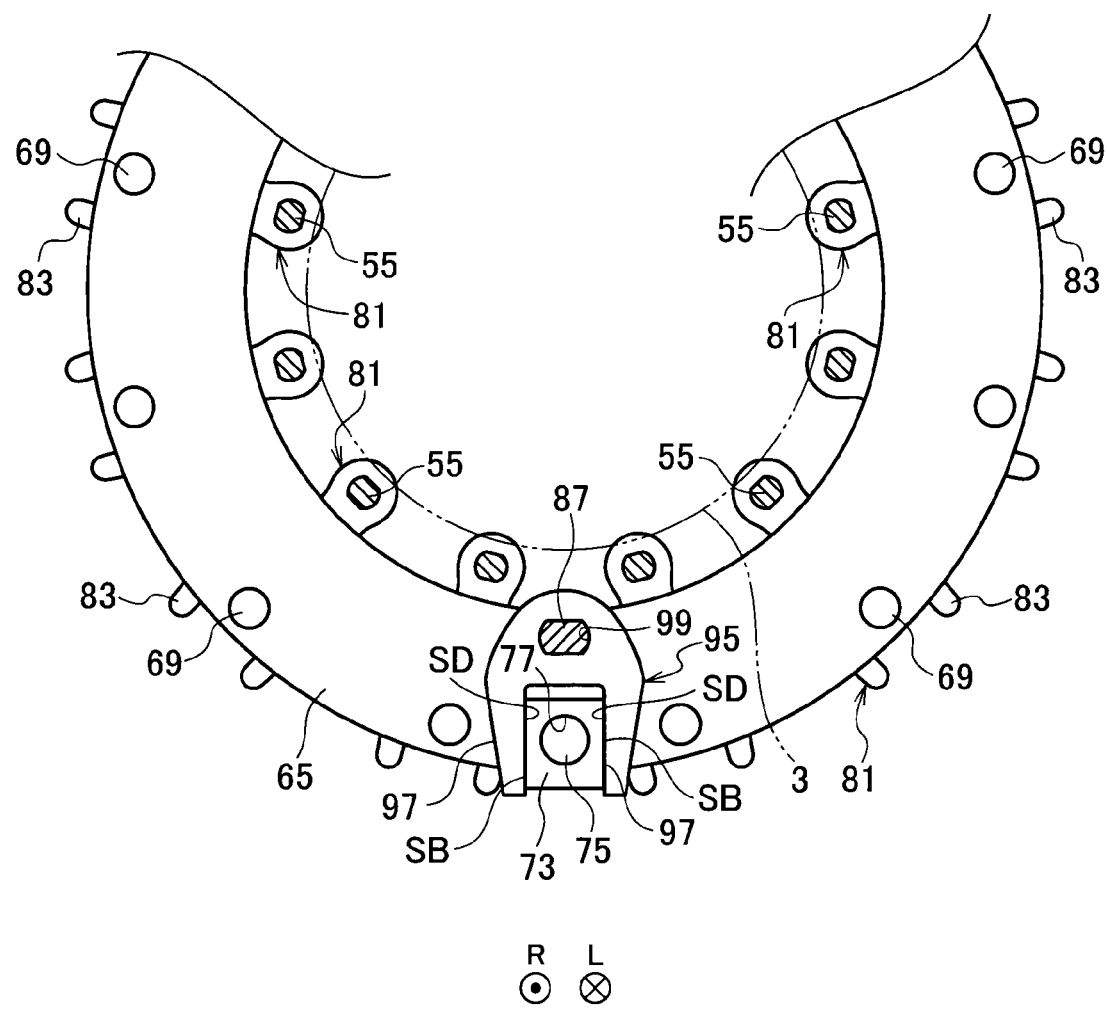
FIG. 9 is a view of a part taken along the IX-IX line of FIG. 6.

As shown in FIGS. 5, 6 and 9, a rectangular driving joint member 73 is provided in portion on the right side surface of the driving ring 65 (the side surface on the one side in the axial direction) in the circumferential direction of the driving ring 65 by means of a connecting pin 75. The driving joint member 73 has power transmission surfaces (driving joint power transmission surfaces, second power transmission surfaces) SB, respectively, on two sides in the circumferential direction of the driving ring 65. Furthermore, an insertion hole 77 in which to insert the connecting pin 75 is formed to penetrate the driving joint member 73.

As shown in FIGS. 6 and 10, a stopper 79 shaped like the letter C and configured to restrain the movement of the driving ring 65 in the left-right direction in cooperation with the right end surfaces of the multiple attachment pins 61 is provided on the right side surface of the guide ring 63. It should be noted that although the stopper 79 is shaped like the letter C, the stopper 79 may be shaped like a ring.

As shown in FIGS. 5 and 8, a base end portion of a nozzle link member (synchronous link member) 81 is integrally connected to the right end portion of the nozzle shaft 55 of each variable nozzle 53. A tip end side of each nozzle link member 81 is divided into two separate parts. In other words, each nozzle link member 81 has a pair of arm portions 83 on its tip end side. Furthermore, the pair of arm portions 83 of each nozzle link member 81 are engaged with their corresponding synchronous joint member 67 in such a way as to sandwich the synchronous joint member 67 in between. The arm portions 83 have power transmission surfaces (nozzle link power transmission surfaces, third power transmission surfaces) SC which can be brought into sliding contact with the power transmission surfaces SA of their corresponding synchronous joint member 67. Furthermore, each nozzle link member 81 has a penetratingly-formed insertion hole 85 configured to allow insertion of the nozzle shaft 55 of the corresponding variable nozzle 53.

As shown in FIG. 5, a driving shaft 87 is provided to the left side portion of the bearing housing 3 (a fixed section of the variable geometry system turbocharger 1) by means of a bush 89 in such a way as to be rotatable about its axis which is parallel to the axis of the turbine impeller 29. The driving shaft 87 rotates in accordance with the drive of a rotary actuator 91, such as an electric motor. Furthermore, a base end portion of a driving lever 93 is integrally connected to the right end portion of the driving shaft 87 (the end portion on the one side in the axial direction). The driving lever 93 is connected to the rotary actuator 91.

As shown in FIGS. 5 and 9, a base end portion of a driving link member 95 is integrally connected to the left end portion of the driving shaft 87 (the end portion on the opposite side in the axial direction). A tip end side of the driving link member 95 is divided into two separated parts. In other words, the driving link member 95 has a pair of arm portions 97 on its tip end side. Furthermore, the pair of arm portions 97 of the driving link member 95 are engaged with the driving joint member 73 in such a way as to sandwich the driving joint member 73 in between. The arm portions have power transmission surfaces (driving link power transmission surfaces, fourth power transmission surfaces) SD which can be brought into sliding contact with the power transmission surfaces SB of their corresponding driving joint member 73. Furthermore, an insertion hole 99 in which to allow insertion of the right end portion of the driving shaft 87 is formed to penetrate the driving link member 95.

Subsequently, descriptions will be provided for characteristic features of the variable nozzle unit 41 of the first embodiment of the present invention.

As shown in FIG. 5, the synchronous joint members 67, the driving joint member 73, the nozzle link members 81 and the driving link member 95 are each the power transmission member as described above. Each of them is obtained by sintering a compact which is formed from a mixture, as an injection material, containing metal powder and a binder by metal powder injection molding. In this embodiment of the present invention, the metal powder is powder of austenite-based stainless steel, and the binder is formed from: multiple types of resins such as polystyrene and polymethyl methacrylate; and a wax such as paraffin wax.

Figure 3B:
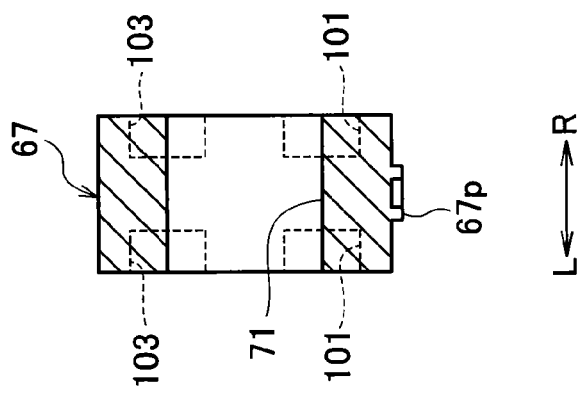
FIG. 3B is a front cross-sectional view of the synchronous joint member.
Figure 3C:
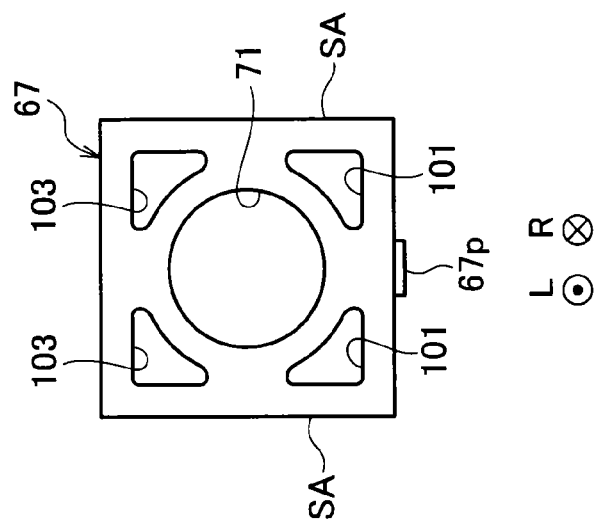
FIG. 3C is a right side view of the synchronous joint member.

As shown in FIGS. 3A, 3B and 3C, in each of the left and right side surfaces of each synchronous joint member 67 (the two side surfaces in the axial direction), a flow promotion recess 101, which is configured to promote the mixture to flow to an area corresponding to the power transmission surface SA when forming a green compact for the synchronous joint member 67, is formed between each power transmission surface SA and a mixture introducing part (introduction place) 67p, that is to say, in each corner on the mixture introducing part 67p side. Furthermore, in each of the left and right side surfaces of the synchronous joint member 67, a flow promotion recess 103, which is configured to complementarily promote the mixture to flow to the area corresponding to the power transmission surface SA when forming the green compact for the synchronous joint member 67, is formed in each corner on an opposite side of the synchronous joint member 67 from the mixture introducing part 67p. Here, the multiple flow promotion recesses 101, 103 formed in the right side surface of the synchronous joint member 67 (the side surface on the one side in the axial direction) are located at opposite positions to the respective multiple flow promotion recesses 101, 103 formed in the left side surface of the synchronous joint member 67 (the side surface on the opposite side in the axial direction).

Figure 4C:
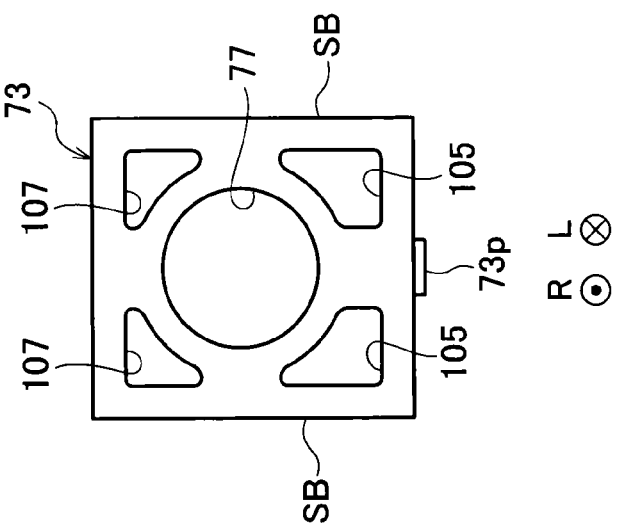
FIG. 4C is a right side view of the driving joint member.
Figure 4B:
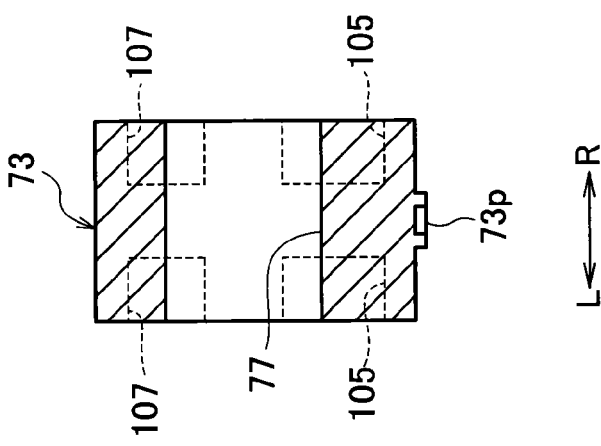
FIG. 4B is a front cross-sectional view of the driving joint member.
Figure 4A:
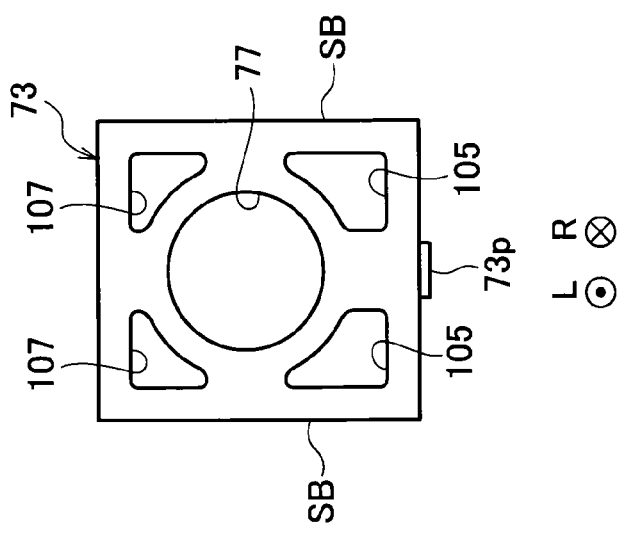
FIG. 4A is a left side view of a driving joint member of the first embodiment of the present invention.

As shown in FIGS. 4A, 4B and 4C, in each of the left and right side surfaces of the driving joint member 73, a flow promotion recess 105, which is configured to promote the mixture to flow to an area corresponding to the power transmission surface SB of the driving joint member 73 when forming a green compact for the driving joint member 73, is formed between each power transmission surface SB and a mixture introducing part (introduction place) 73p, that is to say, in each corner on the mixture introducing part 73p side. Furthermore, in each of the left and right side surfaces of the driving joint member 73, a flow promotion recess 107, which is configured to complementarily promote the mixture to flow to the area corresponding to the power transmission surface SB for the driving joint member 73 when forming the green compact for the driving joint member 73, is formed in each corner on an opposite side of the driving joint member 73 from the mixture introducing part 73p. In addition, the multiple flow promotion recesses 105, 107 formed in the right side surface of the driving joint member 73 are located at opposite positions to the respective multiple flow promotion recesses 105, 107 formed in the left side surface of the driving joint member 73a.

As shown in FIGS. 1A, 1B and 1C, in each of the left and right side surfaces of each arm portion 83 of each nozzle link member 81, a flow promotion recess 109, which is configured to promote the mixture to flow to an area corresponding to the power transmission surface SC of the nozzle link member 81 when forming a green compact 81F (see FIGS. 12A and 12B) for the nozzle link member 81, is formed along the power transmission surface SC of the nozzle link member 81. In addition, flow promotion recesses ill, which are configured to complementarily promote the mixture to flow to areas corresponding to the power transmission surfaces SC of the nozzle link member 81 when forming the green compact for the nozzle link member 81 are formed in each of the left and right side surfaces of a center portion of each nozzle link member 81, that is to say, between the pair of arm portions 83 on each of the left and right side surfaces of the nozzle link member 81. Furthermore, the multiple flow promotion recesses 109, 111 formed in the right side surface of the nozzle link member 81 are located at opposite positions to the respective multiple flow promotion recesses 109, 111 formed in the left side surface of the nozzle link member 81.

As shown in FIGS. 2A, 2B and 2C, in each of the left and right side surfaces of each arm portion 97 of the driving link member 95, multiple flow promotion recesses 113, 115, 117, which are configured to promote the mixture to flow to an area corresponding to the power transmission surface SD of the driving link member 95 when forming a green compact for the driving link member 95, are formed along the power transmission surface SD of the driving link member 95. In addition, the multiple flow promotion recesses 113, 115, 117 formed in the right side surface of the driving link member 95 are located at opposite positions to the respective multiple flow promotion recesses 113, 115, 117 formed in the left side surface of the driving link member 95.

Descriptions will be hereinbelow provided for how the first embodiment of the present invention works, and what effects the first embodiment thereof brings about.

The exhaust gas introduced from the gas introduction port 35 flows through the turbine scroll passage 37, and thereafter flows from the inlet to outlet sides of the turbine impeller 29. Thereby, the rotational force (rotational torque) is generated using the pressure energy of the exhaust gas. Accordingly, the rotor shaft 9 and the compressor impeller 13 can be rotated integrally with the turbine impeller 29. This makes it possible to compress the air introduced from the air introduction port 19, and to discharge the compressed air from the air discharge port 25 via the diffuser passage 21 and the compressor scroll passage 23. Accordingly, the air to be supplied to the engine can be supercharged (compressed).

If the engine speed is in a high speed range while the variable geometry system turbocharger 1 is in operation, the drive of the rotary actuator 91 rotates the driving shaft 87 in one direction (a clockwise direction in FIG. 9), and thereby swings the driving link member 95 in the one direction, concurrently rotating the driving ring 65 in a forward direction (a counterclockwise direction in FIG. 8, and the clockwise direction in FIG. 9). This makes it possible to rotate the multiple variable nozzles 53 synchronously in the forward direction (the opening direction) while swinging the multiple nozzle link members 81 in the forward direction, and thereby to increase the opening of the multiple variable nozzles 53. As a consequence, it is possible to increase the passage area for (the flow rate of) the exhaust gas to be supplied to the turbine impeller 29 side, and thereby to supply more of the exhaust gas to the turbine impeller 29 side.

If the engine speed is in a low speed range, the drive of the rotary actuator 91 rotates the driving shaft 87 in the other direction (the counterclockwise direction in FIG. 9), and thereby swings the driving link member 95 in the other direction, concurrently rotating the driving ring 65 in a reverse direction (a clockwise direction in FIG. 8, and the counterclockwise direction in FIG. 9). This makes it possible to rotate the multiple variable nozzles 53 synchronously in the reverse direction (the closing direction) while swinging the multiple nozzle link members 81 in the reverse direction, and thereby to decrease the opening of the multiple variable nozzles 53. As a consequence, it is possible to decrease the passage area of the exhaust gas to be supplied to the turbine impeller 29 side, thereby to increase the flow velocity of the exhaust gas, and accordingly to ensure the workload of the turbine impeller 29.

The multiple flow promotion recesses 101, 103 are formed in each of the left and right side surfaces of each synchronous joint member 67. For this reason, when the green compact for the synchronous joint member 67 is formed, the flow of the mixture to the areas corresponding to the power transmission surfaces SA is facilitated, and it is accordingly possible to prevent sink marks from occurring in the power transmission surfaces SA of the synchronous joint member 67. Furthermore, the multiple flow promotion recesses 105, 107 are formed in each of the left and right side surfaces of the driving joint member 73. For this reason, when the green compact for the driving joint member 73 is formed, the flow of the mixture to the areas corresponding to the power transmission surfaces SB of the driving joint member 73 is facilitated, and it is accordingly possible to prevent sink marks from occurring in the power transmission surfaces SB of the driving joint member 73.

Similarly, the multiple flow promotion recesses 109, 111 are formed in each of the left and right side surfaces of each nozzle link member 81. For this reason, when the green compact 81F for the nozzle link member 81 is formed, the flow of the mixture to the areas corresponding to the power transmission surfaces SC of the nozzle link member 81 is facilitated, and it is accordingly possible to prevent sink marks from occurring in the power transmission surfaces SC of the nozzle link member 81. Furthermore, the multiple flow promotion recesses 113, 115, 117 are formed in each of the left and right side surfaces of the driving link member 95. For this reason, when the green compact the driving link member 95 is formed, the flow of the mixture to the areas corresponding to the power transmission surfaces SD of the driving link member 95 is facilitated, and it is accordingly possible to prevent sink marks from occurring in the power transmission surfaces SD of the driving link member 95.

Accordingly, the first embodiment of the present invention facilitates the flow of the mixture to the areas corresponding to the power transmission surfaces such as the power transmission surfaces SA when forming the green compacts for the power transmission members such as the synchronous joint members 67, and accordingly can prevent sink marks from occurring in the power transmission surfaces of the power transmission members such as the synchronous joint members 67. For this reason, even when the metal powder injection molding is applied to the production of the power transmission members such as the synchronous joint members 67, it is possible to sufficiently secure the precision in the dimension and shape of the power transmission surfaces of the power transmission members such as the synchronous joint members 67.

Second Embodiment

Referring to FIGS. 11 and 12, descriptions will be provided for a second embodiment of the present invention. It should be noted that as shown in the drawings, reference sign "R" denotes a direction to the right, and reference sign "L" denotes a direction to the left.

As shown in FIG. 11, an injection molding die 119 of the second embodiment of the present invention is used to carry out a power transmission member manufacturing method of the second embodiment of the present invention. A concrete configuration of the injection molding die 119 is as follows.

In an injection molding machine, a stationary die (a stationary block) 123 is detachably provided to the left side surface of a stationary frame 121. On its left, the stationary die 123 has a molding surface 123s whose shape is similar to a shape obtained by inverting (i.e., which is complementary to) the final shape of the left side surface of the nozzle link member 81. Furthermore, in the injection molding machine, a movable die (a movable block) 127 is detachably provided to the right side surface of a movable frame 125 which is movable in the left-right direction. The movable die 127 has a molding surface 127s whose shape is similar to a shape obtained by inverting the final shape of the external surface of the nozzle link member 81 except the left side surface of the nozzle link member 81.

When the injection molding die 119 is closed, a cavity 129 is defined by the molding surface 123s of the stationary die 123 and the molding surface 127s of the movable die 127. Furthermore, a gate 131 is formed in the molding surface 123s of the stationary die 123. A runner 133 communicating with the gate 131 is formed to penetrate the inside of the stationary die 123. The runner 133 can be connected to an injection nozzle 135 of the injection molding machine through a spool 137.

In the molding surface 123s of the stationary die 123 and the molding surface 127s of the movable die 127, inserts (an example of a recess forming part) 139 having external surfaces whose shapes are similar to shapes obtained by inverting the final shapes of the multiple flow promotion recesses 109 are set in the areas corresponding to the flow promotion recesses 109. Similarly, in the molding surface 123s of the stationary die 123 and the molding surface of the movable die 127, inserts (another example of a recess forming part) 141 having external surfaces whose shapes are similar to shapes obtained by inverting the final shapes of the multiple flow promotion recesses 111 are set in the areas corresponding to the flow promotion recesses 111.

Descriptions will be hereinafter provided for the power transmission member manufacturing method of the second embodiment of the present invention.

The power transmission member manufacturing method of the second embodiment of the present invention is a method of manufacturing the nozzle link member 81 which is one of the power transmission members, and includes an injection step, a degreasing step and a firing step.

Concrete contents of the steps are as follows.

(i) Injection Step

As shown in FIG. 11, the movable frame 125 is moved in the right direction by driving a die opening/closing actuator (whose illustration is omitted) such as a hydraulic cylinder. Thereby, integrally with the movable frame 125, the movable die 127 is moved in the right direction. Thus, the injection molding die 119 is closed. Thereafter, with the multiple inserts 139, 141 set in the molding surface 123s of the stationary die 123 and the molding surface 127s of the movable die 127, the mixture containing the metal powder and the binder is injected into the cavity 129 from the injection nozzle 135 through the spool 137, the runner 133 and the gate 131, and the binder is hardened inside the cavity 129. By this, the compact 81F (see FIG. 12A) whose shape is similar to the final shape of the nozzle link member 81 can be molded.

After hardening the binder inside the cavity 129, the movable frame 125 is moved in the left direction by driving the die opening/closing actuator. Thereby, integrally with the movable frame 125, the movable die 127 is moved in the left direction. Thus, the injection molding die 119 is opened. Thereafter, the compact 81F is removed from the injection molding die 119 by performing a die releasing process depending on the necessity.

(ii) Degreasing Step

Figure 12A:
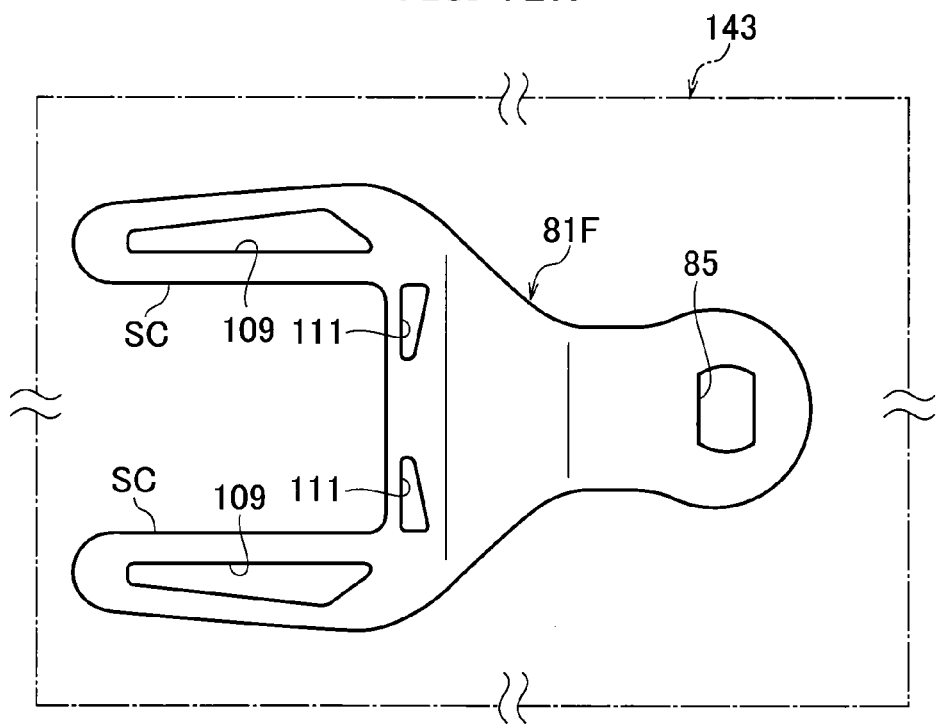
FIG. 12A is a diagram for explaining a degreasing step included in the power transmission member manufacturing method of the second embodiment of the present invention.

After the completion of the injection step, the compact 81F is set at a predetermined position in a degreasing furnace 143 using a degreasing furnace jig (whose illustration is omitted), as shown in FIG. 12A. Thereafter, with the inside of the degreasing furnace 143 kept filled with a nitrogen gas atmosphere (an example of a non-oxidation atmosphere), the compact 81F is heated to a predetermined degreasing temperature with a heater (whose illustration is omitted) of the degreasing furnace 143. By this, the binder included in the compact 81F can be removed by heating.

It should be noted that: the technique for removing the binder is not limited to the above-mentioned heated degreasing; and other techniques such as eluting degreasing and solvent degreasing may be employed instead.

(iii) Firing Step

Figure 12B:
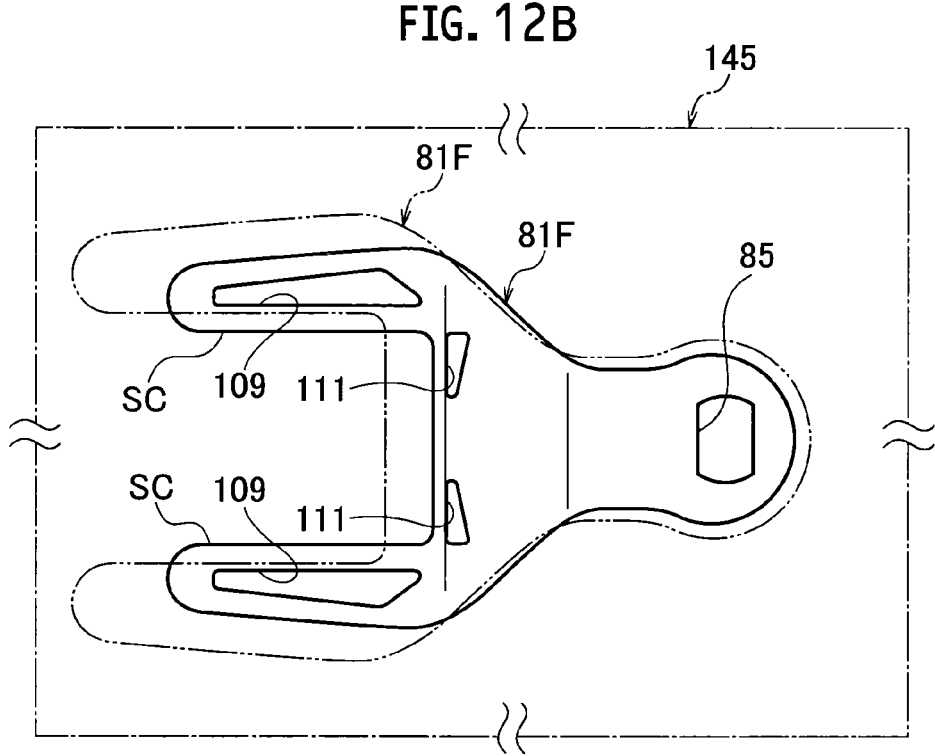
FIG. 12B is a diagram for explaining a firing step included in the power transmission member manufacturing method.

After the completion of the degreasing step, the compact 81F is set at a predetermined position in a sintering furnace 145 using a sintering furnace jig (whose illustration is omitted), as shown in FIG. 12B. Thereafter, with the inside of the sintering furnace 145 kept filled with a vacuum atmosphere (another example of the non-oxidation atmosphere), the compact 81F is fired and sintered by heating the compact 81F to a predetermined sintering temperature with a heater (whose illustration is omitted) of the sintering furnace 145. Thereby, the compact 81F is thermally contracted from a shape indicated with an imaginary line to a final shape indicated with a solid line. Thus, the nozzle link member 81 formed from the compact (sintered body) 81F can be manufactured.

Descriptions will be hereinbelow provided for how the second embodiment of the present invention works and what effects the second embodiment thereof brings about.

The compact 81F is molded by injecting the mixture containing the metal powder and the binder into the cavity 129 with the multiple inserts 139, 141 set in the molding surface 123s of the stationary die 123 and the molding surface 127s of the movable die 127. For this reason, the inserts 139, 141 promote the mixture to flow to the areas corresponding to the power transmission surfaces SC of the nozzle link member 81 inside the cavity 129. Accordingly, it is possible to prevent sink marks from occurring in the power transmission surfaces SC of the nozzle link member 81.

As a consequence, the second embodiment of the present invention can sufficiently secure the precision in the dimension and shape of the power transmission surfaces SC of the nozzle link member 81 even when applying the metal powder injection molding to the production of the nozzle link member 81.

It should be noted that the present invention is not limited to what has been described in the foregoing embodiments. The present invention can be carried out in other various modes for example, by doing things such as changing the target of the power transmission member manufacturing of the second embodiment from the nozzle link members 81 to the synchronous joint members 67, the driving joint member 73 or the driving link member 95. Furthermore, the scope of rights encompassed by the present invention is not limited to the embodiments.

What is claimed is:

1. A variable nozzle unit capable of varying a passage area for an exhaust gas to be supplied to a turbine impeller in a variable geometry system turbocharger, comprising:

a base ring disposed concentrically with the turbine impeller inside a turbine housing in the variable geometry system turbocharger, and including a plurality of supporting holes formed to penetrate the base ring and arranged in a circumferential direction of the base ring;

a plurality of variable nozzles disposed on the base ring in a circumferential direction of the base ring in such a way as to surround the turbine impeller, each variable nozzle being rotatable about its axis parallel to an axis of the turbine impeller, and including a nozzle shaft being integrally formed on a side surface of the variable nozzle on one side in an axial direction of the turbine impeller, and penetrating and being rotatably supported by the corresponding supporting hole in the base ring; and a link mechanism disposed on one side of the base ring in the axial direction, and configured to synchronously rotate the plurality of variable nozzles, wherein the link mechanism includes:

a driving ring provided on the one side of the base ring in the axial direction, rotatably and concentrically with the base ring;

as many synchronous joint members as the variable nozzles, the synchronous joint members disposed on the driving ring in the circumferential direction of the driving ring, and each synchronous joint member having first power transmission surfaces on two sides in the circumferential direction of the driving ring;

a driving joint member provided to the driving ring, and having second power transmission surfaces on two sides in the circumferential direction of the driving ring;

nozzle link members whose base end portions are integrally connected respectively to the nozzle shafts of the variable nozzles, and whose tip end side is engaged with its corresponding synchronous joint member in such a way as to sandwich the synchronous joint member and includes third power transmission surfaces capable of being brought into sliding contact with the first power transmission surfaces of the corresponding synchronous joint member;

a driving shaft provided in a fixed section of the variable geometry system turbocharger in such a way as to be rotatable about its axis parallel to the axis of the turbine impeller, and configured to rotate in response to drive of a rotary actuator; and a driving link member whose base end portion is integrally connected to an opposite side of the driving shaft in the axial direction, and whose tip end side is engaged with the driving joint member in such a way as to sandwich the driving joint member and includes fourth power transmission surfaces capable of being brought into sliding contact with the second power transmission surfaces of the driving joint member, at least one power transmission member among the synchronous joint members, the driving joint member, the nozzle link members and the driving link member is formed by sintering a compact which is molded from a mixture containing metal powder and a binder, as an injection material, by metal powder injection molding, and flow promotion recesses are formed in two side surfaces of the one power transmission member in the axial direction, the flow promotion recesses configured to promote the mixture to flow to areas corresponding to the power transmission surfaces while the compact is being molded.

2. The variable nozzle unit according to claim 1, wherein the flow promotion recesses formed in one side surface of the one power transmission member in the axial direction are located at opposite positions to the respective flow promotion recesses formed in the other side surface of the one power transmission member in the axial direction.

3. The variable nozzle unit according to claim 2, wherein the flow promotion recesses are formed between a part for introducing the mixture and the power transmission surfaces.

4. The variable nozzle unit according to claim 3, wherein the flow promotion recesses are formed along the power transmission surfaces.

5. The variable nozzle unit according to claim 2, wherein the flow promotion recesses are formed along the power transmission surfaces.

6. The variable nozzle unit according to claim 1, wherein the flow promotion recesses are formed between a part for introducing the mixture and the power transmission surfaces.

7. The variable nozzle unit according to claim 6, wherein the flow promotion recesses are formed along the power transmission surfaces.

8. The variable nozzle unit according to claim 1, wherein the flow promotion recesses are formed along the power transmission surfaces.

9. A variable geometry system turbocharger configured to supercharge air to be supplied toward an engine by using pressure energy of an exhaust gas from the engine, comprising the variable nozzle unit according to claim 1.

10. A power transmission member manufacturing method of manufacturing any one power transmission member among a synchronous joint member, a driving joint member, a nozzle link member and a driving link member which are to be used in a variable nozzle unit, comprising:

an injection step of, by use of an injection molding die having molding surfaces whose shapes are similar to shapes obtained by inverting a final shape of the one power transmission member, injecting a mixture containing metal powder and a binder into a cavity defined by the molding surfaces of the injection molding die in a state where recess forming parts having external surfaces whose shapes are similar to shapes obtained by inverting final shapes of flow promotion recesses are provided in the molding surfaces of the injection molding die, and thereby molding the green compact whose shape is similar to the final shape of the one power transmission member;

a degreasing step of removing the binder included in a compact after completion of the injection step; and a firing step of firing and sintering the compact, and thereby thermally contracting the compact to the final shape.

\* \* \* \* \*